(12) United States Patent
Fiore et al.

(10) Patent No.: US 11,788,434 B2
(45) Date of Patent: Oct. 17, 2023

(54) METHOD FOR PRODUCING A CASING FOR AN AIRCRAFT TURBINE ENGINE

(71) Applicants: SAFRAN AIRCRAFT ENGINES, Paris (FR); SAFRAN AEROSPACE COMPOSITES, Rochester, NH (US)

(72) Inventors: Vincent Pascal Fiore, Moissy-Cramayel (FR); Gatien Frisoni, Moissy-Cramayel (FR); Foster Alexander Maxwell, Conway, NH (US); Steven Meserve, Ossipee, NH (US); Jeffrey Steven Sherman, Durham, NH (US)

(73) Assignees: SAFRAN AIRCRAFT ENGINES, Paris (FR); SAFRAN AEROSPACE COMPOSITES, Rochester, NY (US)

( * ) Notice: Subject to any disclaimer, the term of this patent is extended or adjusted under 35 U.S.C. 154(b) by 0 days.

(21) Appl. No.: 17/626,322

(22) PCT Filed: Jul. 10, 2020

(86) PCT No.: PCT/FR2020/051258
§ 371 (c)(1),
(2) Date: Jan. 11, 2022

(87) PCT Pub. No.: WO2021/009457
PCT Pub. Date: Jan. 21, 2021

(65) Prior Publication Data
US 2022/0243617 A1    Aug. 4, 2022

Related U.S. Application Data

(60) Provisional application No. 62/874,385, filed on Jul. 15, 2019.

(51) Int. Cl.
*F01D 25/24* (2006.01)
*B29C 65/00* (2006.01)
*B29L 31/00* (2006.01)

(52) U.S. Cl.
CPC ............ *F01D 25/24* (2013.01); *B29C 66/612* (2013.01); *B29C 66/919* (2013.01);
(Continued)

(58) Field of Classification Search
CPC ... B29C 66/612; B29C 66/929; B29C 66/919; B29C 66/949; B29C 11/22;
(Continued)

(56) References Cited

U.S. PATENT DOCUMENTS

2013/0129494 A1* 5/2013 Duchaine ................ F01D 9/041
415/213.1
2014/0367920 A1* 12/2014 Konigs .................. F01D 11/122
264/157
(Continued)

FOREIGN PATENT DOCUMENTS

EP    2813672 A1    12/2014
FR    2993490 A1    1/2014
(Continued)

OTHER PUBLICATIONS

International Search Report received for PCT Patent Application No. PCT/FR2020/051258, dated Nov. 11, 2020, 8 pages (3 pages of English Translation and 5 pages of Office Action).

*Primary Examiner* — Igor Kershteyn
(74) *Attorney, Agent, or Firm* — WOMBLE BOND DICKINSON (US) LLP

(57) ABSTRACT

Method for manufacturing a casing of an aircraft turbomachine, the casing including an annular shell extending about an axis A and made of a composite material including fibres that are woven and immersed in a resin, the annular layer
(Continued)

including an abradable material arranged inside the shell, and covering a first inner annular surface of an intermediate section of the shell, the method including a step of gluing the layer on the first surface, during which the casing is heated and compressed by a system that is present at least partially inside the casing, wherein, prior to the heating and compression of the casing, a forming tool is mounted inside the casing and is made of two rings.

12 Claims, 4 Drawing Sheets

(52) U.S. Cl.
CPC ..... *B29C 66/929* (2013.01); *B29L 2031/7504* (2013.01); *F05D 2220/323* (2013.01); *F05D 2220/36* (2013.01); *F05D 2230/60* (2013.01); *F05D 2300/603* (2013.01)

(58) Field of Classification Search
CPC . B29C 11/53245; B29C 11/63; B29C 11/721; B29C 33/76; B29C 43/18; B29C 65/48; F01D 25/24; F02C 7/045; B29L 2031/7504; F05D 2300/603; F05D 2260/36; F05D 2260/31; F05D 2250/141; F05D 2250/14; F05D 2220/36; F05D 2220/323; Y02T 50/60
See application file for complete search history.

(56) References Cited

U.S. PATENT DOCUMENTS

| | | | |
|---|---|---|---|
| 2015/0069657 A1* | 3/2015 | Hannecart | B29C 70/78 264/249 |
| 2017/0297241 A1* | 10/2017 | Magnaudeix | F04D 29/526 |
| 2018/0169972 A1* | 6/2018 | Mathon | F01D 25/24 |
| 2019/0105857 A1* | 4/2019 | Derclaye | B29C 70/386 |

FOREIGN PATENT DOCUMENTS

| | | |
|---|---|---|
| FR | 2997725 A1 | 5/2014 |
| FR | 2997726 A1 | 5/2014 |
| FR | 3005100 A1 | 10/2014 |
| FR | 3026674 A1 | 4/2016 |
| FR | 3059044 A1 | 5/2018 |
| FR | 3060438 A1 | 6/2018 |

* cited by examiner

[Fig. 1]
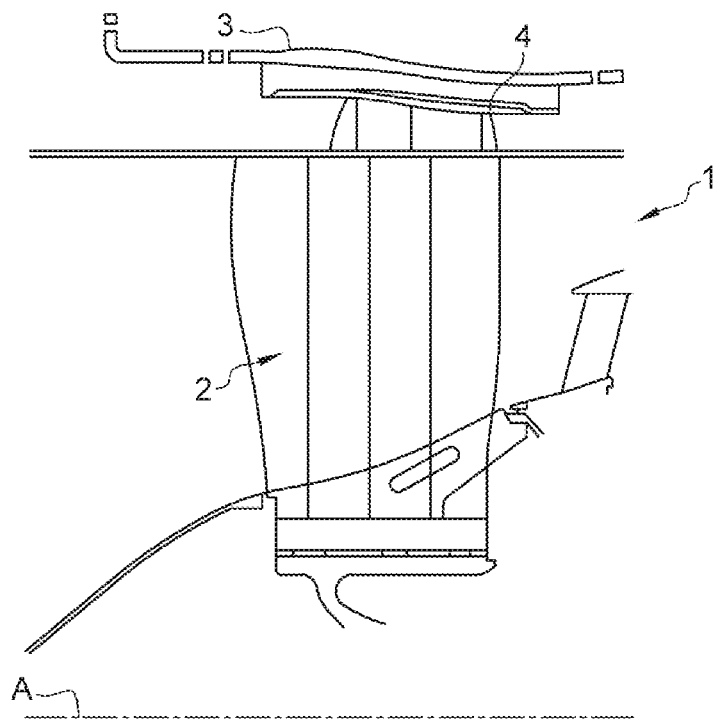
[Fig. 2]
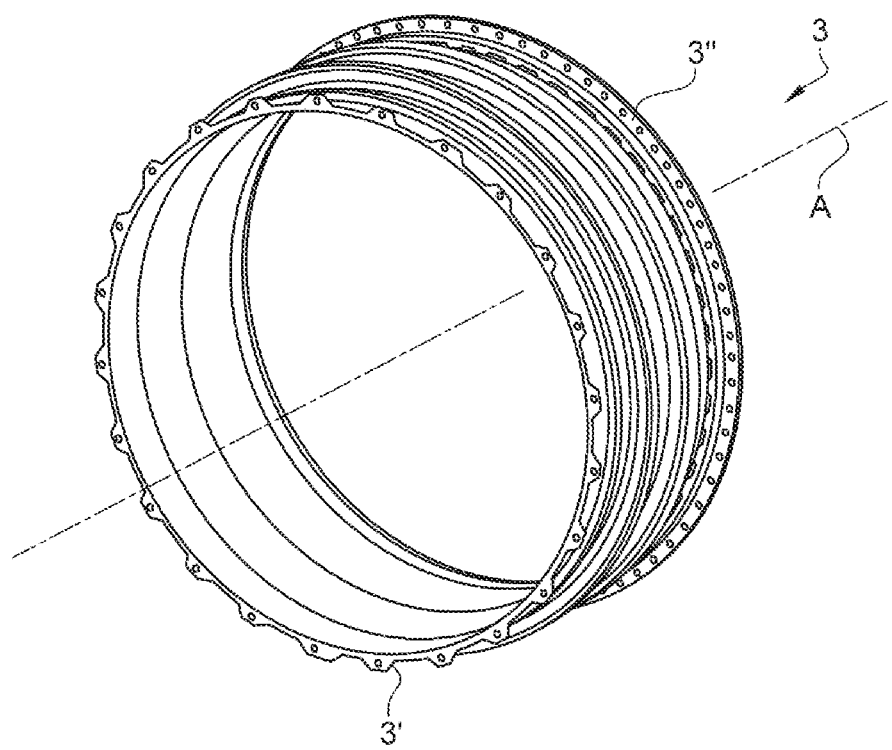

[Fig. 3]
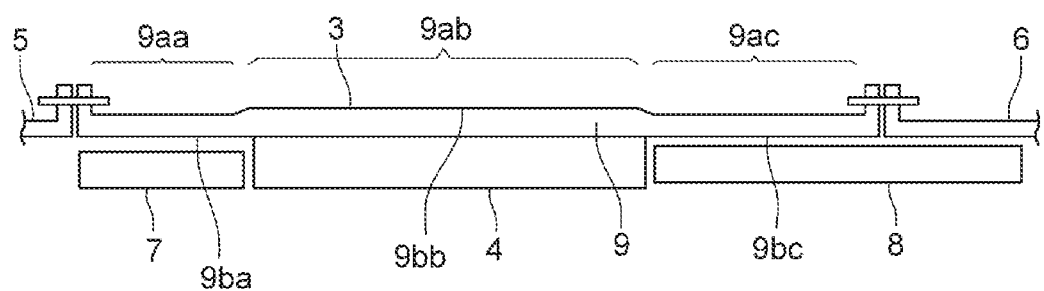
[Fig. 4]
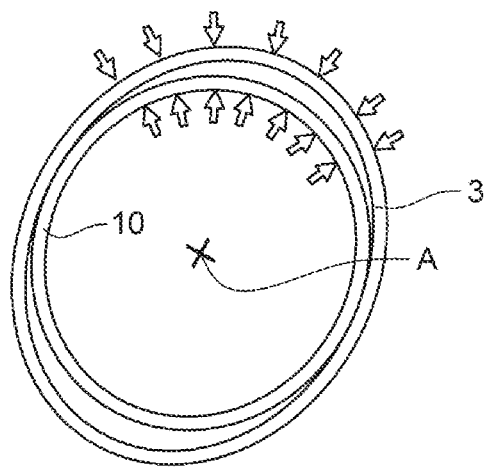

[Fig. 5]
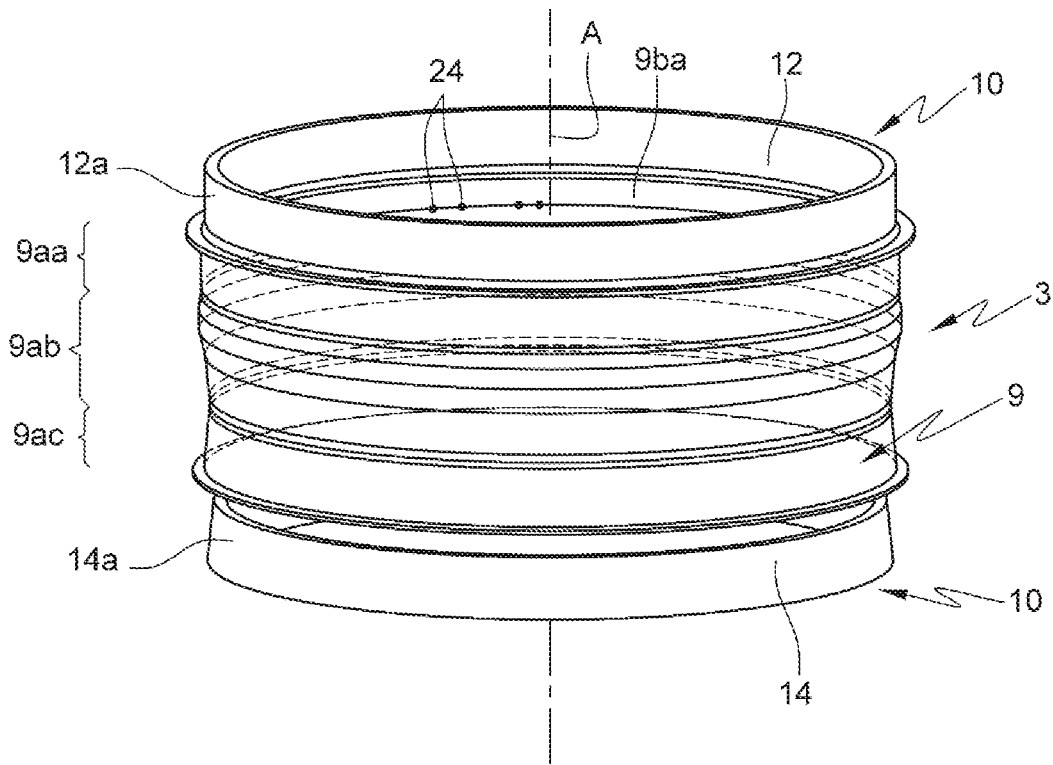
[Fig. 6]
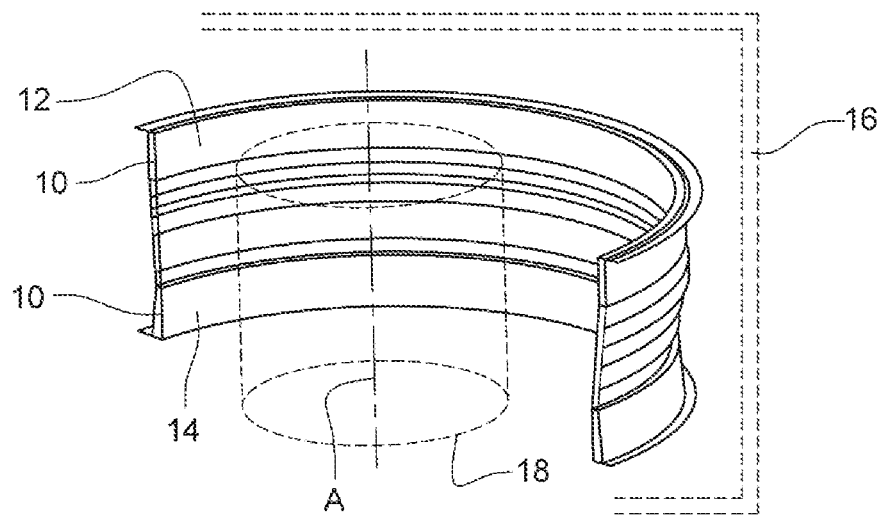

[Fig. 7]
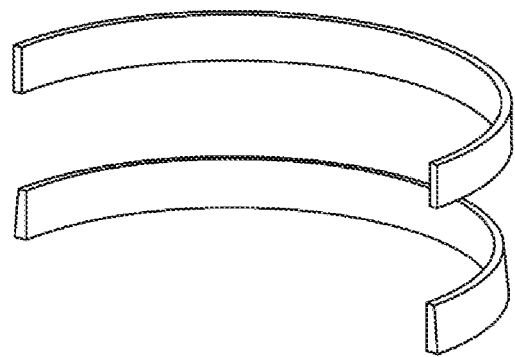
[Fig. 8]
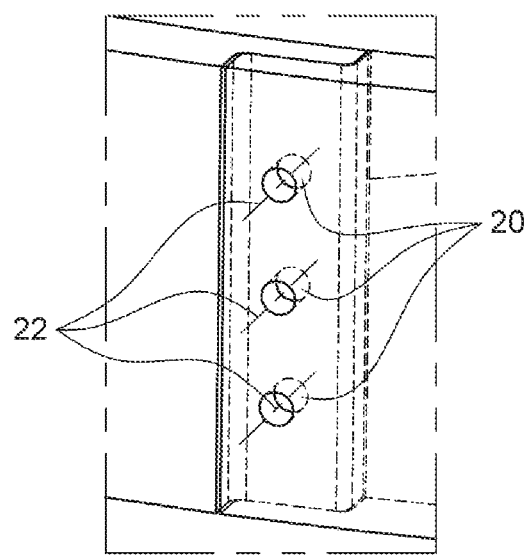

METHOD FOR PRODUCING A CASING FOR AN AIRCRAFT TURBINE ENGINE

TECHNICAL FIELD OF THE INVENTION

The present invention relates to the manufacturing of a casing, in particular of a fan, for an aircraft turbomachine.

TECHNICAL BACKGROUND

The state of the art comprises, in particular, documents FR-A1-2 997 725, FR-A1-2 997 726, FR-A1-3 005 100 and FR-A1-3 060 7438.

FIG. 1 provides a partial view of a fan of an aircraft turbomachine.

Conventionally, a turbomachine comprises, from upstream to downstream, i.e. in the direction of the gas flow, a fan, one or several compressors, a combustion chamber, one or several turbines, and an exhaust pipe for the combustion gases exiting the turbine or turbines.

The fan 1 comprises a blade wheel 2 that is surrounded by a fan casing 3, also termed retention casing because it serves a blade retention purpose should the blades break loose, or if debris should penetrate inside the fan.

As is seen in FIG. 2, the fan casing 3 typically comprises an annular shell with an axis of revolution A that extends around the blades of the fan 2 of the turbomachine. This shell comprises an annular attachment flange 3', 3" at each of its axial ends. These flanges 3', 3" are used to attach the casing 3 to one of the annular walls of the nacelle of the turbomachine.

FIG. 3 is a schematic cross-section showing a fan casing 3 according to the prior art.

The fan casing 3 is connected, in the upstream section, to an air inlet duct 5 and, in the downstream section, to an intermediate casing shroud 6. The casing also supports upstream acoustic panels 7 and downstream acoustic panels 8. The fan casing 3 further comprises an annular layer 4 made of an abradable material 4, positioned on an inner annular surface of the shell, between the upstream panels 7 and the downstream panels 8.

In addition to its retention function, the fan casing 3 is also designed to:
- ensure mechanical continuity (of stresses and moments) between the air inlet duct 5 and the shroud 6 of the intermediate casing;
- enable the attachment of the panels 7, 8 and of the layer 4;
- enable the attachment of equipment and supports that are well known in the field;
- complying with regulatory specifications relating to fire and leaks;
- enabling a continuity of the electrical current for lightning impulse withstand, etc.

It has already been proposed to manufacture the shell of the fan casing out of a composite material from fibres woven and immersed in a polymeric resin, the manufacturing process being of the "RTM" type (for "Resin Transfer Moulding").

In a RTM process, a mould comprising two half-shells, placed one on top of the other, define a moulding cavity. The fibres are woven in three dimensions to create a fibrous preform that is inserted in the cavity of the mould between the two semi-shells, prior to the injection of the resin.

The polymerisation of the resin is conducted by maintaining the two half-shells closed. Depending on the required production rate, the polymerisation is conducted at ambient temperature or by heating.

The use of such a process is particularly advantageous as it makes it possible to produce parts that have an overall weight that is lesser than the same parts produced in a metallic material, while featuring a mechanical resistance that is at least equivalent, if not greater.

However, it has been observed upon demoulding—i.e. during the extraction of the manufactured part—that deformation occurs with respect to the theoretical nominal geometry. Thus, by way of example, it is possible to observe, for a fan casing, a defect with respect to a theoretical circular geometry, translating into the ovalization of this part appearing as it is extracted from the mould.

This type of deformation generates the following types of problem: assembly (mating gaps between components), manufacturing (heterogeneous machining of the part), the other parts have to be adapted to the oval shape of the casing (e.g. abradable layer), mechanical behaviour (heterogeneous mechanical properties), aerodynamics (heterogeneous aerodynamic flow path), etc.

Such defects can in particular be explained by the fact that residual constraints apply to the part during its manufacturing inside the mould (e.g. polymerisation gradient, winding tension for a part made of composite material), and are released when the part is extracted from the mould, thereby leading to deformations of the extracted part.

To overcome this disadvantage, a known process is to use at least one mould comprising a moulding cavity with a geometry that does not match the nominal geometry of the part to be manufactured, but a geometry for which the deformation has been taken into account, so as to eventually obtain, when the part is extracted from the mould, the nominal geometry of the part.

Advantageously, such a process will also counter the ovalization of a revolution part upon its demoulding. However, during the manufacturing of a fan casing, the observed ovalization thereof does not occur only upon its extraction from the mould. Indeed, the manufacturing of the casing subsequently implies various successive operations, such as machining (e.g. trimming and drilling) and gluing (e.g. of the abradable layer) operations.

The machining operations lead to the release of physical constraints that are conducive to deformations of the casing. The gluing operations are commonly conducted in an oven. The gluing operations involve steps of temperature raising and pressurising the casing, followed by a casing cooling step. All of these steps lead to the appearance of constraints acting on the ovalization of the casing. Various casing ovalization instances are therefore likely to appear throughout the manufacturing process and tend to accumulate. The state of the art therefore seems insufficient to counter the ovalization of the fan casing during its manufacturing, as the appearance of this ovalization does not only occur upon the extraction of the casing from its moulding cavity, but also during the machining and gluing steps.

The present invention proposes a solution to limit the risk of ovalization of a fan casing during gluing operations of an abradable annular layer.

During this operation, the casing is placed in an oven as mentioned above, and a part of the pressurising system is mounted inside the casing to exert pressure on the abradable layer, radially from the inside towards the outside. This system further ensures a constant process temperature during the operation. This system is relatively cumbersome and prevents the use of solutions known in the prior art, such as that detailed in document FR-A1-3 060 7438, consisting of providing several annular parts (rims, flanges, drums, bladders, etc.) inside the casing, and occupying the entire space of the casing.

The present invention proposes a simple, efficacious and cost-efficient solution to this problem.

SUMMARY OF THE INVENTION

The invention relates to a method for manufacturing a casing of an aircraft turbomachine, said casing comprising:
- an annular shell extending about an axis A and made of a composite material comprising fibres that are woven and immersed in a resin,
- an annular layer comprising an abradable material arranged inside the shell, and covering a first inner annular surface of an intermediate section of the shell, the method comprising a step of gluing the layer on the first surface, during which the casing is heated and compressed by means of a system that is present at least partially inside the casing, characterised in that, prior to the heating and compression of the casing, a forming tool is mounted inside the casing and made of two rings, i.e. a first ring arranged inside the shell, and covering a second inner annular surface of an end section of the shell, and a second ring arranged inside the shell, and covering a third inner annular surface of another end section of the shell, said intermediate section being arranged between the two end sections.

The forming of the fan casing is therefore ensured by two rings only, the rings being respectively mounted inside the two end sections of the composite shell of the casing. These forming elements are therefore simple as they have an annular shape and do not take up space inside the casing, and the centre of the casing can therefore contain a part of the system required to heat and/or pressurise the casing during the gluing of the abradable layer.

The method according to the invention can comprise one or several of the following characteristics, considered individually or in combination:
- the casing undergoes a pressure ranging from 1 to 10 bars, and preferably from 2 to 6 bars, during the compression;
- the casing undergoes a temperature ranging from 25 to 300° C., and preferably from 80 to 200° C., during the heating;
- the casing undergoes the heating and the compression for a duration ranging from 60 to 500 minutes, preferably from 180 to 300 minutes;
- the rings are divided into sectors and each comprises ring sectors arranged circumferentially end-to-end and comprising circumferential ends that overlap mutually;
- the circumferential ends comprise first through-orifices for the passage of attachment members;
- the first orifices of the rings are aligned with second orifices of the shell, the attachment members being screwed in or through these second orifices;
- the rings each have a diameter ranging from 1000 to 3000 mm, and preferably from 1500 to 2500 mm, and/or an axial dimension ranging from 50 to 300 mm, and preferably from 100 to 200 mm, and/or a radial thickness ranging from 10 to 100 mm, and preferably from 20 to 50 mm;
- the method comprises, after heating and compression, the disassembly and removal of the rings;
- the casing is placed in an autoclave during heating.

BRIEF DESCRIPTION OF THE FIGURES

Other characteristics and advantages of the invention will be made clearer upon reading the following detailed description, with reference to the appended drawings, in which:

FIG. 1 is mentioned above and shows a partial cross-section view of a fan of an aircraft turbomachine according to the state of the art;

FIG. 2 is mentioned above and shows a perspective view of a fan casing according to the state of the art;

FIG. 3 is mentioned above and shows a schematic partial cross-section view of a fan casing according to the state of the art;

FIG. 4 is a highly schematic transversal cross-section view of the casing according to the invention, illustrating its ovalization risk;

FIG. 5 is a perspective view of a fan casing as well as two forming rings;

FIG. 6 is a perspective and axial cross-section view of the fan casing and the forming rings of FIG. 5 in an assembled position;

FIG. 7 is a perspective and axial cross-section view of the forming rings of FIG. 5; and FIG. 8 is a perspective view on a larger scale of the circumferential ends of two sectors of a forming ring of FIG. 5.

DETAILED DESCRIPTION DF THE INVENTION

In the following description, the invention is applied to a fan casing 3. The invention is however not limited to this type of casing and can be applied to other turbomachine casings.

The casing 3 to which the method according to the invention is applied has a general annular shape around an axis A. This casing 3 comprises:
- an annular shell 9 extending about the axis A and made of a composite material comprising fibres that are woven and immersed in a resin, and
- an annular layer 4 comprising an abradable material arranged inside the shell 9, and covering a first inner annular surface 9ab of an intermediate section 9bb of the shell (FIG. 3).

The annular layer 4 is intended to be secured by gluing on the first inner surface 9bb of the shell 9. This layer 4 can comprise a sandwich structure comprising an annular skin supporting an abradable annular coating. As mentioned above, during this gluing step, the casing 3 is heated and compressed and likely to undergo ovalization (FIG. 4). To prevent this ovalization, the invention proposes a specific tool 10 that is arranged inside the casing 3 and forms the casing 3 during the gluing operations, during which the casing 3 undergoes a pressurised thermal treatment.

The FIGS. 5 to 8 show an embodiment of this tool 10 that consists of two rings 12, 14. With the exception of the members used to maintain the rings 12, 14 and possibly secure them to the casing 3, the tool 10 does not comprise any other parts and is therefore relatively simple.

In practice, during the gluing operation, the casing 3 is placed in an autoclave 16 so that its axis A is oriented vertically. A pressurisation system 18 is mounted inside the casing 3, said system 18 being schematically shown in FIG.

6. The system 18 occupies a part of the inner space of the casing 3 and the tool 10 is designed to take this constraint into account.

A first ring 12, for example an upper ring, is arranged inside the shell 9 of the casing 3, and covers a second inner annular surface 9ba of an end section 9aa of the shell, and a second ring 14, for example a lower ring, is arranged inside the shell and covers a third inner annular surface 9bc of another end section 9ac of the shell. The intermediate section 9ab of the shell, the inner surface 9bb of which is covered by the abradable layer 4, is arranged between the two end sections 9aa, 9ac (FIGS. 3 and 5).

The rings 12, 14 are not necessarily identical. Each being conformed and sized for the shape and dimensions of the surface 9ba, 9bc on which it is applied. The upper ring 12 may, for example, have an outer surface 12a with a cylindrical form, whereas the lower ring 14 may have an outer surface 14a with a frusto-conical form. The surfaces 12a and 9ba, on one hand, and 14a and 9bc, on the other hand, are therefore complementary.

As shown in the drawings, the rings 12, 14 are preferably divided into sectors to facilitate their mounting in the casing 3. Indeed, had they been made of a single part, it would be difficult, and even impossible, to arrange them inside the casing, in particular if the casing has already undergone ovalization. Each ring can comprise at least two sectors arranged circumferentially end-to-end.

FIG. 8 shows that the circumferential ends of the sectors of a ring 12, 14 mutually overlap and can comprise orifices 20 for the passage of attachment members 22 of the screw-nut type for example. Each ring sector is therefore secured to one or several adjacent sectors at the level of its circumferential ends.

To ensure an accurate positioning of the ring 12, 14 inside the casing 3, it can further be envisaged to align the orifices 20 of the rings with the orifices 24 of the shell 9 (FIG. 5). The attachment members 22 are passed through the orifices 20 of the sectors and can be screwed in the orifices 24 of the shell, or pass through these orifices and receive, for example, nuts. The orifices 24 of the shell are for example the orifices that are intended to secure the shell to the acoustic insulation panels 7, 8 mentioned above and shown in FIG. 3.

In an alternative version, the ring sectors can be secured to one another by other types of members.

The rings 12, 14 are preferably ovalized in a material that is more rigid than that of the shell. They are for example made of metal.

In a specific example of an embodiment of the invention, each ring 12, 14 has:
 a diameter ranging from 1000 to 3000 mm, and preferably from 1500 to 2500 mm,
 an axial dimension ranging from 50 to 300 mm, and preferably from 100 to 200 mm, and
 a radial thickness ranging from 10 to 100 mm, and preferably from 20 to 50 mm.

The rings 12, 14 are thus arranged inside the casing 3 and on the surfaces 9ba, 9bc of the shell 9 to prevent an ovalization of the casing during the gluing step of the abradable layer 4, during which the casing undergoes a double thermal and pressurisation treatment.

During this operation, the casing 3 undergoes a pressure ranging from 1 to 10 bars, and preferably from 2 to 6 bars. This compression can be achieved by placing the casing in a vacuum, for example between two annular elements arranged respectively inside the abradable layer and outside the shell. The casing 3 can undergo a temperature ranging from 25 to 300° C., and preferably between 80 and 200° C. This operation can be conducted during a cycle that lasts between 60 and 500 minutes, and preferably between 180 and 300 minutes.

At the end of this operation, the temperature and the pressure that the casing 3 undergoes are lowered. After complete cooling of the casing 3, the abradable layer is glued and secured on the shell 9, and the rings 12, 14 can be disassembled and removed.

The invention is advantageous on different levels. In technical terms, there is no longer the need to take into account the ovalization effect when defining the shell. In industrial terms, there is no longer the need for specific machining operations of the abradable layer or of the shell. The manufacturing and assembly of the casing are simplified, and so is its three-dimensional inspection. The invention therefore enables to improve the mechanical and aerodynamic performance of the casing, and its manufacturing method, thereby providing a time gain for the overall cycle.

The invention claimed is:

1. A method for manufacturing a casing of an aircraft turbomachine, said casing comprising:
 an annular shell extending about an axis and made of a composite material comprising fibres that are woven and immersed in a resin,
 an annular layer comprising an abradable material arranged inside the shell, and covering a first inner annular surface of an intermediate section of the shell,
 the method comprising a step of gluing the layer on the first surface, during which the casing is heated and compressed by means of a system that is present at least partially inside the casing,
 wherein, prior to the heating and compression of the casing, a forming tool is mounted inside the casing and made of a first ring arranged inside the shell, and covering a second inner annular surface of an end section of the shell, and a second ring arranged inside the shell, and covering a third inner annular surface of another end section of the shell, said intermediate section being arranged between the two end sections.

2. The method according to claim 1, wherein the casing undergoes a pressure ranging from 1 to 10 bars during the compression.

3. The method according to claim 1, wherein the casing undergoes a temperature ranging from 25 to 300° C. during the heating.

4. The method according to claim 1, wherein the casing undergoes the heating and the compression for a duration ranging from 60 to 500 minutes.

5. The method according to claim 1, wherein the rings are divided into sectors and each comprises ring sectors arranged circumferentially end-to-end and comprising circumferential ends that overlap mutually.

6. The method according to claim 5, wherein the circumferential ends comprise first through-orifices for the passage of attachment members.

7. The method according to claim 6, wherein the first orifices of the rings are aligned with second orifices of the shell, the attachment members being screwed in or through these second orifices.

8. The method according to claim 1, wherein the rings each have:
 a diameter ranging from 1000 to 3000 mm,
 an axial dimension ranging from 50 to 300 mm, and
 a radial thickness ranging from 10 to 100 mm.

9. The method according to claim 1, wherein it comprises, after the heating and the compression, the disassembly and removal of the rings.

10. The method according to claim 1, wherein the casing is placed in an autoclave during the heating process.

11. A method for manufacturing a casing of an aircraft turbomachine, said casing comprising:

an annular shell extending about an axis and made of a composite material comprising fibres that are woven and immersed in a resin, an annular layer comprising an abradable material arranged inside the shell, and covering a first inner annular surface of an intermediate section of the shell, the method comprising a step of gluing the layer on the first surface, during which the casing is heated and compressed by means of a system that is present at least partially inside the casing, wherein, prior to the heating and compression of the casing, a forming tool is mounted inside the casing and made of two rings, i.e., a first ring arranged inside the shell, and covering a second inner annular surface of an end section of the shell, and a second ring arranged inside the shell, and covering a third inner annular surface of another end section of the shell, said intermediate section being arranged between the two end sections, and wherein the rings are divided into sectors and each comprises ring sectors arranged circumferentially end-to-end and comprising circumferential ends that overlap mutually.

12. A method for manufacturing a casing of an aircraft turbomachine, said casing comprising:

an annular shell extending about an axis and made of a composite material comprising fibres that are woven and immersed in a resin, an annular layer comprising an abradable material arranged inside the shell, and covering a first inner annular surface of an intermediate section of the shell, the method comprising a step of gluing the layer on the first surface, during which the casing is heated and compressed by means of a system that is present at least partially inside the casing, wherein, prior to the heating and compression of the casing, a forming tool is mounted inside the casing and made of two rings, i.e., a first ring arranged inside the shell, and covering a second inner annular surface of an end section of the shell, and a second ring arranged inside the shell, and covering a third inner annular surface of another end section of the shell, said intermediate section being arranged between the two end sections, and wherein it comprises, after the heating and the compression, the disassembly and removal of the rings.

* * * * *